(12) United States Patent
Ostermann et al.

(10) Patent No.: US 12,169,148 B2
(45) Date of Patent: Dec. 17, 2024

(54) MAGNETIC FIELD DIFFERENTIAL TORQUE SENSOR

(71) Applicant: Allegro MicroSystems, LLC, Manchester, NH (US)

(72) Inventors: Till-Jonas Ostermann, Germany (DE); Alexander Latham, Harvard, MA (US)

(73) Assignee: Allegro MicroSystems, LLC, Manchester, NH (US)

( * ) Notice: Subject to any disclaimer, the term of this patent is extended or adjusted under 35 U.S.C. 154(b) by 298 days.

(21) Appl. No.: 17/651,265

(22) Filed: Feb. 16, 2022

(65) Prior Publication Data
US 2023/0258515 A1 Aug. 17, 2023

(51) Int. Cl.
*G01L 3/10* (2006.01)
*G01L 5/22* (2006.01)

(52) U.S. Cl.
CPC .............. *G01L 3/101* (2013.01); *G01L 3/104* (2013.01); *G01L 5/221* (2013.01)

(58) Field of Classification Search
CPC .......... G01L 3/101; G01L 3/104; G01L 5/221
See application file for complete search history.

(56) References Cited

U.S. PATENT DOCUMENTS

| | | | |
|---|---|---|---|
| 5,417,122 A | 5/1995 | Casey et al. | |
| 8,324,891 B2 | 12/2012 | Kejik et al. | |
| 8,453,518 B2 | 6/2013 | Diekmann et al. | |
| 8,729,892 B2 | 5/2014 | Friedrich | |
| 10,270,428 B1 | 4/2019 | Geisler et al. | |
| 10,326,389 B2 | 6/2019 | Lu et al. | |
| 10,408,639 B2 | 9/2019 | Hakspiel et al. | |
| 10,651,767 B2 | 5/2020 | Lu et al. | |
| 10,816,366 B2 | 10/2020 | Weiland et al. | |
| 10,866,122 B2 | 12/2020 | Weiland et al. | |
| 11,448,713 B1 * | 9/2022 | Ostermann | ........ G01R 33/0005 |

(Continued)

FOREIGN PATENT DOCUMENTS

| | | |
|---|---|---|
| DE | 10 2008 006 865 A1 | 8/2009 |
| EP | 1 382 510 A1 | 1/2004 |
| WO | WO 2006/008425 A1 | 1/2006 |

OTHER PUBLICATIONS

U.S. Notice of Allowance dated Jul. 25, 2022 for U.S. Appl. No. 17/374,219; 12 pages.

(Continued)

*Primary Examiner* — Helen C Kwok
(74) *Attorney, Agent, or Firm* — DALY, CROWLEY, MOFFORD & DURKEE, LLP (57) ABSTRACT

Systems, methods, and apparatus for differential magnetic field torque sensors that include first and second magnetic targets for coupling to one or more rotatable shafts. The magnetic targets can include multipole ring magnets having a plurality of alternating magnetic domains. First and second differential magnetic field angular position sensors positioned proximate to the magnetic targets produce angular position of the targets and a processing unit is operative to receive an angular position from each of the first and second differential magnetic field angular position sensors and determine a difference between the angular positions. The difference corresponds to an angle between the targets, and the processing unit is operative to calculate, based on the angle, a torque applied to the one or more rotatable shafts.

19 Claims, 5 Drawing Sheets

(56) References Cited

U.S. PATENT DOCUMENTS

| | | | |
|---|---|---|---|
| 2002/0195551 A1* | 12/2002 | Baxter | G01D 5/34776 |
| | | | 250/231.13 |
| 2004/0011138 A1 | 1/2004 | Gandel et al. | |
| 2013/0261886 A1* | 10/2013 | Aoki | G01L 3/105 |
| | | | 702/41 |
| 2015/0137797 A1 | 5/2015 | Ausserlechner et al. | |
| 2016/0161289 A1* | 6/2016 | Fujita | G01D 5/245 |
| | | | 324/207.21 |
| 2018/0154926 A1* | 6/2018 | Ohira | B62D 15/02 |
| 2018/0231399 A1 | 8/2018 | Okumura et al. | |
| 2018/0364066 A1 | 12/2018 | Satz et al. | |
| 2019/0162609 A1* | 5/2019 | Mochizuki | B62D 15/0235 |
| 2019/0170497 A1* | 6/2019 | Ausserlechner | G01B 7/30 |
| 2019/0195713 A1 | 6/2019 | Mochizuki et al. | |
| 2019/0265018 A1* | 8/2019 | Latham | G01R 33/0017 |
| 2019/0317120 A1 | 10/2019 | Fontanesi et al. | |
| 2021/0011096 A1 | 1/2021 | Lassalle-Balier et al. | |
| 2021/0018309 A1 | 1/2021 | Ausserlechner | |
| 2021/0148734 A1 | 5/2021 | Foletto | |
| 2022/0003572 A1 | 1/2022 | Stewart | |
| 2022/0357144 A1 | 11/2022 | Tombez | |

OTHER PUBLICATIONS

International Search Report and Written Opinion dated Jun. 29, 2023, for International Application No. PCT/US2023/010556; 19 pages.

Didier Angleviel, Didier Frachon, Gérald Masson, Development of a Contactless Hall effect torque sensor for Electric Power Steering, 2006-01-0939, 2005 SAE International, 8 pages.

* cited by examiner

MAGNETIC FIELD DIFFERENTIAL TORQUE SENSOR

BACKGROUND

Magnetic field sensors can be used in a variety of applications. In one application, a magnetic field sensor can be used to detect an angle of rotation of an object. In another related application, a magnetic field sensor can be used to sense a rotation (e.g., a continuous or discontinuous rotation) of an object.

Various magnetic sensing elements can be used within magnetic field sensors. For example, planar Hall effect elements and vertical Hall effect elements are known types of magnetic field sensing elements. A planar Hall effect element tends to be responsive to magnetic fields perpendicular to a surface of a substrate on which the planar Hall effect element is formed. A vertical Hall effect element tends to be responsive to magnetic fields parallel to a surface of a substrate on which the vertical Hall effect element is formed. Magnetoresistance elements are also known types of magnetic field sensing elements that are used for magnetic field sensors. Some types of magnetoresistance elements tend to be responsive to magnetic fields parallel to a surface of a substrate on which the magnetoresistance element is formed.

Various parameters characterize the performance of magnetic field sensing elements and magnetic field sensors that use magnetic field sensing elements. These parameters include sensitivity, which is a change in an output signal of a magnetic field sensing element in response to a change of magnetic field experienced by the magnetic sensing element, and linearity, which is a degree to which the output signal of the magnetic field sensing element varies in direct proportion to the magnetic field. These parameters also include an offset, which is characterized by an output signal from the magnetic field sensing element not representative of a zero magnetic field when the magnetic field sensing element experiences a zero magnetic field.

Stray magnetic fields caused by other sources such as magnetic components or electric currents can interfere with the performance of magnetic field sensors and sensing elements. Such stray magnetic fields may pose significant problems in applications, e.g., automotive, where electric motors, batteries, and other electromagnetic components are used. For example, electric motors that drive electric vehicles ("EVs") and hybrid electric vehicles ("HEVs") typically require significant amounts of electric current, and therefore produce strong magnetic fields around the cables delivering the electric current from the battery or alternator to the motor. Other common lower-current components can also generate significant stray magnetic fields in automotive applications, e.g., electronic power steering ("EPS") pumps, electric windows or sunroofs, and any other electrically actuated devices used in the vehicles. Because stray magnetic fields can affect the accuracy of the magnetic fields sensors and can cause significant output errors for such sensors, systems and signal processing relying on such sensors can likewise be negatively impacted by stray magnetic fields.

SUMMARY

Embodiments of the present disclosure provide systems, methods, and apparatus for differential angle and/or torque sensing with sensors that tend to reject and/or are resistant to magnetic stray fields.

An example differential magnetic field torque sensor can include a first multipole magnet assembly having a plurality of magnetic pole pairs and configured for coupling to a first rotatable shaft; a second multipole magnet assembly having a plurality of magnetic pole pairs and configured for coupling to a second rotatable shaft, wherein the first rotatable shaft is coupled, e.g., mechanically coupled, to the second rotatable shaft by an elastic element; a first differential magnetic field angular position sensor positioned proximate to the first multipole magnet assembly and configured to produce an angular position of the first multipole magnet assembly; a second differential magnetic field angular position sensor positioned proximate to the second multipole magnet assembly and configured to produce an angular position of the second multipole magnet assembly; a processing unit operative to receive an angular position from each of the first and second differential magnetic field angular position sensors and determine a difference between the angular positions, wherein the difference corresponds to an angle, and wherein the processing unit is operative to calculate, based on the angle, a torque applied to the first or second rotatable shaft.

For the sensor, each of the first and second differential magnetic field angular position sensors can include, (i) a first array of magnetic field sensing elements; (ii) a second array of magnetic field sensing elements, wherein the first array of magnetic field sensing elements is spaced a distance from the second array of magnetic field sensing elements, wherein the first and second arrays of magnetic field sensing elements each have at least first and second axes of maximum sensitivity, wherein the first axis of maximum sensitivity is orthogonal to the second axis of maximum sensitivity; and (iii) an angular position module to determine angular position of the multipole magnet assembly from differential signals from the first and second arrays of magnetic field sensing elements.

The first or second differential magnetic field angular position sensor can include Hall effect elements. The first or second differential magnetic field angular position sensor can include magnetoresistance elements. For the first differential magnetic field angular position sensor, the distance the first array of magnetic field sensing elements is spaced from the second array of magnetic field sensing elements can be configured to match a pitch of adjacent magnetic pole pairs of the first multipole magnet assembly. For the second differential magnetic field angular position sensor, the distance the first array of magnetic field sensing elements is spaced from the second array of magnetic field sensing elements can be configured to match a pitch of adjacent magnetic pole pairs of the second multipole magnet assembly.

The angular position module can include an arctan calculation module and/or be configured to provide CORDIC processing. The first or second multipole magnet assembly can include a ring magnet. For the first differential magnetic field angular position sensor, the differential signals from the first and second arrays of magnetic field sensing elements can include a sine signal and a cosine signal. For the second differential magnetic field angular position sensor, the differential signals from the first and second arrays of magnetic field sensing elements can include a sine signal and a cosine signal.

The elastic element can include a torsion bar. The first and second multipole magnet assemblies can be disposed concentrically in a common plane in an end-shaft configuration, wherein the first multipole magnet assembly has a first radius, and the second multipole magnet assembly has a second radius different than the first radius. The first and second differential magnetic field angular position sensors can be disposed on a common die. The common die can be disposed adjacent the first and second multipole magnet assemblies and parallel to the common plane.

The first and second multipole magnet assemblies can be disposed in first and second parallel planes, respectively, in a side-shaft configuration. The first and second differential magnetic field angular position sensors can be disposed on a common die. The common die can be disposed adjacent the first and second multipole magnet assemblies and orthogonal to the parallel planes.

The angular position module can be operative to calculate a coupling matrix for magnetic coupling between the first and second arrays of magnetic field sensing elements. The angular position module can be further operative to calculate an inversion matrix based on the coupling matrix and to correct the differential signals from the first and second arrays of magnetic field sensing elements.

The processing unit can be operative to calculate a coupling matrix for magnetic coupling between the first and second differential magnetic field angular position sensors. The processing unit can further be operative to calculate an inversion matrix based on the coupling matrix and to correct the angular positions from the first and second differential magnetic field angular position sensors.

DESCRIPTION OF THE SEVERAL VIEWS OF THE DRAWINGS

The manner and process of making and using the disclosed embodiments may be appreciated by reference to the figures of the accompanying drawings. It should be appreciated that the components and structures illustrated in the figures are not necessarily to scale, emphasis instead being placed upon illustrating the principals of the concepts described herein. Like reference numerals designate corresponding parts throughout the different views. Furthermore, embodiments are illustrated by way of example and not limitation in the figures, in which.

DETAILED DESCRIPTION

Before describing example embodiments of the disclosure, some information is provided. As used herein, the term "magnetic field sensing element" refers to a variety of electronic elements that can sense a magnetic field. The magnetic field sensing element can be, but is not limited to, a Hall effect element, a magnetoresistance element, or a magnetotransistor. As is known, there are different types of Hall effect elements, for example, a planar Hall effect element, and a vertical Hall effect element. As is also known, there are different types of magnetoresistance elements, for example, a semiconductor magnetoresistance element such as Indium Antimonide (InSb), a giant magnetoresistance (GMR) element, for example, a spin valve, an anisotropic magnetoresistance element (AMR), a tunneling magnetoresistance (TMR) element, and a magnetic tunnel junction (MTJ). The magnetic field sensing element may be a single element or, alternatively, may include two or more magnetic field sensing elements arranged in various configurations, e.g., a half bridge or full (Wheatstone) bridge. Depending on the device type and other application requirements, the magnetic field sensing element may be a device made of a type IV semiconductor material such as Silicon (Si) or Germanium (Ge), or a type III-V semiconductor material like Gallium-Arsenide (GaAs) or an Indium compound, e.g., Indium-Antimonide (InSb).

As is known, some of the above-described magnetic field sensing elements tend to have an axis of maximum sensitivity parallel to a substrate that supports the magnetic field sensing element, and others of the above-described magnetic field sensing elements tend to have an axis of maximum sensitivity perpendicular to a substrate that supports the magnetic field sensing element. In particular, planar Hall effect elements tend to have axes of sensitivity perpendicular to a substrate, while metal based or metallic magnetoresistance elements (e.g., GMR, TMR, AMR) and vertical Hall effect elements tend to have axes of sensitivity parallel to a substrate.

As used herein, the term "magnetic field sensor" refers to an assembly that uses one or more magnetic field sensing elements in combination with an electronic circuit, typically all disposed upon a common substrate, e.g., a semiconductor substrate. Magnetic field sensors are used in a variety of applications, including, but not limited to, angle sensors that sense an angle of a direction of a magnetic field, angle sensors that sense an angle of rotation of a target object, and rotation sensors that sense rotation of a rotating target object (e.g., speed and direction of rotation).

Magnetic field sensors in the form of angle and/or rotation sensors that can sense an angle of rotation of a ferromagnetic object are described herein. As used herein, the term "magnetic field signal" is used to describe any circuit signal that results from a magnetic field experienced or sensed by a magnetic field sensing element.

The terms "parallel" and "perpendicular" are used in various contexts herein. It should be understood that the terms parallel and perpendicular do not require exact perpendicularity or exact parallelism, but instead it is intended that normal manufacturing tolerances apply, which tolerances depend upon the context in which the terms are used. In some instances, the term "substantially" is used to modify the terms "parallel" or "perpendicular." In general, use of the term "substantially" reflects angles that are beyond manufacturing tolerances, for example, within +/−ten degrees.

As used herein, the term "processor" or "processing unit" refers to an electronic circuit that performs a function, an operation, or a sequence of operations. The function, operation, or sequence of operations can be hard coded into the electronic circuit or soft coded by way of instructions held in a memory device. A "processor" or "processing unit" can perform the function, operation, or sequence of operations using digital values or using analog signals.

In some embodiments, the "processor" or "processing unit" can be embodied in an application specific integrated circuit (ASIC), which can be an analog ASIC or a digital ASIC. In some embodiments, the "processor" or "processing unit" can be embodied in a microprocessor with associated program memory. In some embodiments, the "processor" or "processing unit" can be embodied in a discrete electronic circuit, which can be analog or digital.

As used herein, the term "module" can describe a "processor." The term "module" can, however, be used more generally to describe any circuit that can transform an input signal into an output signal that is different than the input signal.

A processor can contain internal processors or internal modules that perform portions of the function, operation, or sequence of operations of the processor. Similarly, a module can contain internal processors or internal modules that perform portions of the function, operation, or sequence of operations of the module.

While electronic circuits shown in figures herein may be shown in the form of analog blocks or digital blocks (e.g., processors or modules), it will be understood that the analog blocks can be replaced by digital blocks (e.g., processors or modules) that perform the same or similar functions and the digital blocks can be replaced by analog blocks that perform the same or similar functions. Analog-to-digital or digital-to-analog conversions may not be explicitly shown in the figures but should be understood as being present.

In particular, it should be understood that a so-called comparator can be composed of an analog comparator having a two-state output signal indicative of an input signal being above or below a threshold level (or indicative of one input signal being above or below another input signal). The comparator can, however, also or alternatively be composed of a digital circuit (e.g., processor or module) having an output signal or value with at least two states indicative of an input signal or value being above or below a threshold level (or indicative of one input signal or value being above or below another input signal or value), respectively, or a digital signal or value above or below a digital threshold signal or value (or another digital signal or value), respectively.

As used herein, the term "predetermined," when referring to a value or signal, refers to a value or signal that is set, or fixed, in the factory at the time of manufacture, or by external means, e.g., programming, thereafter. As used herein, the term "determined," when referring to a value or signal, refers to a value or signal that is identified by a circuit during operation, after manufacture.

As used herein, the term "amplifier" refers to a circuit element with a gain greater than one, less than one, or equal to one.

As used herein, the terms "line" and "linear" are used to describe either a straight line or a curved line. The line can be described by a function having any order less than infinite.

Figure 1:
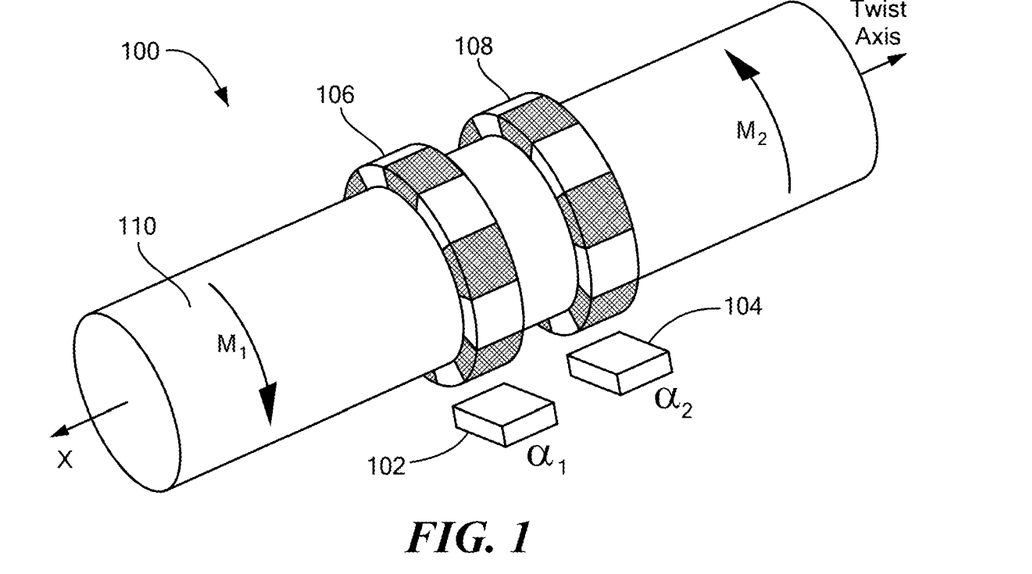
FIG. 1 is a diagram of an example magnetic field differential torque sensor in a side-shaft configuration, in accordance with the present disclosure.

FIG. 1 is a diagram of an example differential magnetic field torque sensor 100 that is configured to reject stray magnetic fields, in accordance with embodiments of the present disclosure. The sensor 100 includes first and second first differential magnetic field angular position sensors 102, 104 that are positioned adjacent first and second targets 106, 108, respectively. The first and second targets 106, 108 are coupled to, e.g., mounted on, a rotatable member 110, which is shown as a representative shaft under a loading condition of an applied torque, indicated by opposing torques M1 and M2. The magnetic field sensors 102, 104 are operative to detect an angular position (angle) of the respective adjacent targets 106, 108, and to produce corresponding signals indicating angular position, $\alpha_1$ and $\alpha_2$. It will be understood that rotatable member 110 is not necessarily a single-piece object, it may have different shapes than as shown, and it may be composed of or include multiple components or pieces, such as a torsion bar, as described in further detail below. In exemplary embodiments, the first and second targets 106, 108 are ring magnets, as shown. The configuration of the magnetic field sensors 102, 104 and targets 106, 108 in relation to the rotatable member 110 (e.g., shaft) as shown in FIG. 1 may be referred to as a "side-shaft" configuration, for some applications.

The differential magnetic field angular position sensors 102, 104 can each include or be composed of sets of magnetic field sensing elements positioned to detect magnetic field changes in a desired manner, as described more fully below. In example embodiments, the differential magnetic field angular position sensors 102, 104 can each include two or more Hall effect elements configured so that the difference of the signals from the Hall effect elements can be used as differential signals that have stray-field effects reduced and/or removed by difference processing. In some embodiments, the differential magnetic field angular position sensors 102 and/or 104 or the like can be considered or referred to (individually or collectively) as "means for detecting differential angular position."

In operation of the sensor 100, as a torque is applied to rotatable member 110 about a twist axis, the torque is transferred and distributed along the rotatable member 110. Because the two targets 106, 108 (e.g., ring magnets) are positioned at different locations along the length of the rotatable member 110 (in the direction of the twist axis), they rotate by different amounts and undergo an angular displacement (angular shift) with respect to one another. The distance between the targets 106, 108 is one factor affecting the amount of angle shift between the differential sensors 102, 104 due to a given applied torque. As described in further detail below, an elastic element such as a torsion bar can be used as part of the physical connection between the targets 106, 108, with extensions or sections (e.g., sheaths or sleeves) employed to bring the targets 106, 108 close to each other, e.g., in a side-by-side arrangement for a side-shaft sensor configuration or concentric to one another for an end-shaft sensor configuration.

With continued reference to FIG. 1, a processor (not shown) can receive the differential magnetic angles, $\alpha_1$ and $\alpha_2$, and calculate the difference between the angles; this difference in angles corresponds to the relative difference in angular displacements of—i.e., the angle between—the targets 106, 108 under the given applied torque. By multiplying that angle difference (itself an angle) by a system defined factor k, the applied torque can be obtained. Defined factor k may be, e.g., related to the modulus of rigidity of the material(s) and/or geometry (moment of inertia) of the rotatable member 110.

Figure 2:
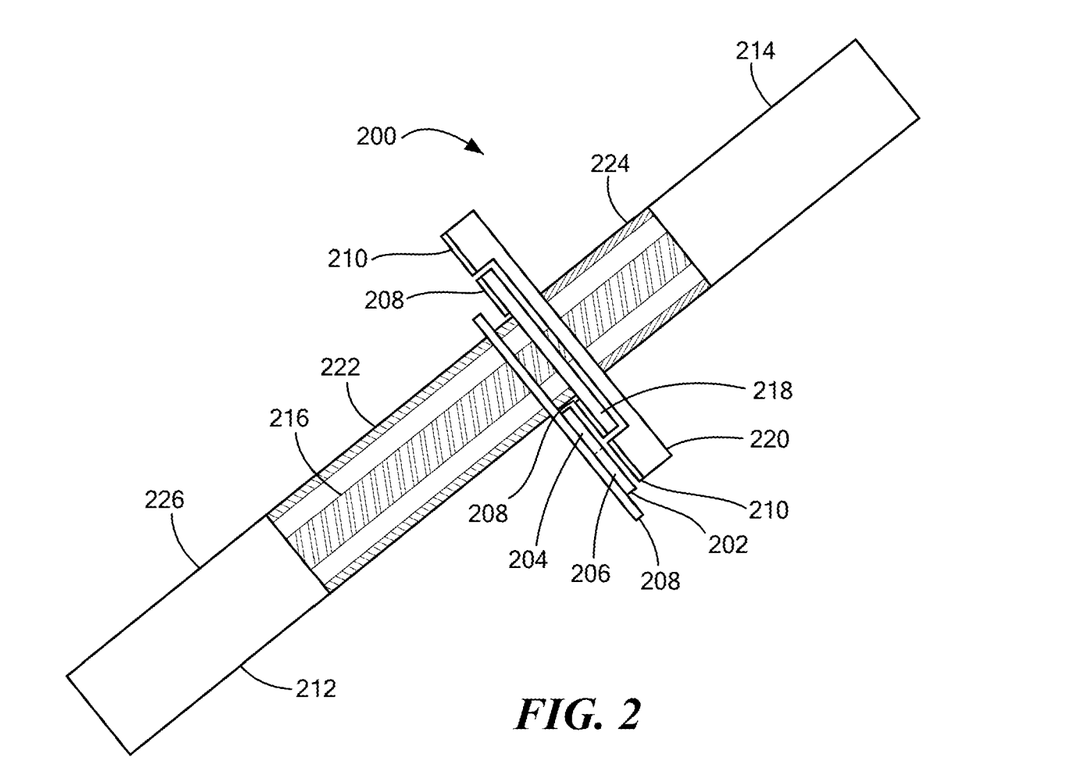
FIG. 2 is a diagram of an example magnetic field differential torque sensor in an end-shaft configuration, in accordance with the present disclosure.

FIG. 2 shows an example differential magnetic field torque sensor 200 in an end-shaft configuration, in accordance with exemplary embodiments of the present disclosure. The sensor 200 is generally similar to sensor 100 of FIG. 1 but the differential sensors are positioned in an end-shaft configuration and instead of a single rotatable member, two rotatable shafts 212, 214 are connected by an intermediate elastic element 216 (e.g., torsion bar). The use of an intermediate elastic element 216 can improve signal strength (e.g., magnitude) and/or signal-to-noise ratio (S/N) of the sensed signals.

As shown in FIG. 2, the sensor 200 includes first and second differential magnetic field sensors 204, 206 mounted on a suitable support or substrate 208, e.g., a printed circuit board (PCB) adjacent to respective targets 208, 210. In exemplary embodiments, the differential magnetic field angular position sensors 204, 206 can be integrated into a common integrated circuit (IC) package 202. In exemplary embodiments, the targets 208 and 210 may be ring magnets, each having a plurality of alternating magnetic domains or poles, e.g., formed by separate and joined magnets or by differently magnetized portions of a unitary ring structure. The targets 208, 210 are coupled to the first and second shafts 212 and 214 by sheaths (or sleeves) 222, 224, respectively. The targets 208, 210 can be mounted on respective supports 218, 220, which in turn are connected to sheaths 222, 224. As noted above, the first and second shafts 212 and 214 are connected by an elastic member 216, e.g., torsion bar.

The torsion bar 216 can be used to increase the angle signal strength for angle measurement by create a larger angle of twist (which is easier to measure/detect) from a given applied torque on the first or second shafts 212, 214. The torsion bar 216 can be designed, by appropriate geometry and/or material selection (e.g., use of a particular metal alloy) to twist through a specific range of angles for typical applied loads. The sheaths 222, 224 allow the targets 208, 210 to be mounted close to each other even though the actual portions of the first and second shafts 212, 214 to which they are respectively attached are separated by a longer distance, facilitating measurement of the relative angle between the shafts 212, 214. Though not shown, other associated circuits and components, e.g., processors as described below, can be included on the support 208. It will be understood that the indicated positions of supports 218, 220 along torsion bar 216 and the lengths of sheaths 222, 224 are merely representative and are given for purposes of explanation; those positions and lengths may be varied within the scope of the present disclosure. Moreover, in some embodiments, a support 218, 220 may be mounted to or adjacent to a shaft 212 or 214, such that only one sheath is used (instead of two) with that sheath spanning substantially the entire length of the torsion bar 216, allowing the other sheath to be omitted.

In operation of sensor 200, as a torque is applied to either shaft 212 or 214, the torque is transferred through the elastic element 216 (torsion bar) to the other shaft. The torsion bar 216 undergoes an amount of twist (more extreme than otherwise would occur in its absence) and the connected shafts (212, 214) are rotated accordingly with respect to one another by some angle (e.g., theta). The two targets 208, 210, which, while adjacent to one another for angle measurement, are connected to the separate shafts 212, 214 and accordingly undergo the same angular shift with respect to one another (e.g., theta) as do shafts 212, 214. In exemplary embodiments, system 200 may be utilized as a torque measurement sensor for a steering column 226 in automobile applications, with shafts 212, 214 and elastic element 216 being components of a steering column.

Figure 3:
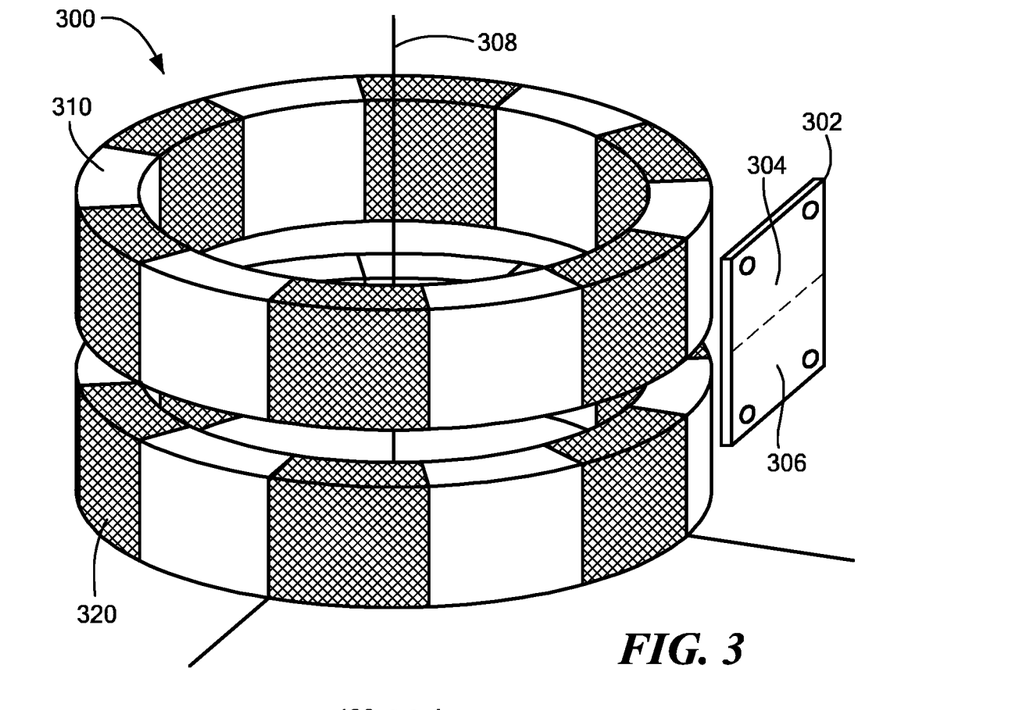
FIG. 3 is a diagram of an exemplary embodiment of a magnetic field differential torque sensor in a side-shaft configuration utilizing a common die, in accordance with the present disclosure.

FIG. 3 is a diagram of an exemplary embodiment of a magnetic field differential torque sensor 300 in a side-shaft configuration utilizing a common die for its magnetic sensing elements, in accordance with the present disclosure. The sensor 300 includes a die 302 on which two differential magnetic field sensors 304, 306 are disposed. Each sensor 304, 306 includes a pair of dual-axis magnetic field sensing elements (indicated by circles) for measuring angular position of a proximate respective target 310, 320 about rotation axis 308. As noted previously, the targets 310, 320 may be coupled to one or more rotatable members, e.g., rods, shafts, or other components, for which torque measurement is desired. In exemplary embodiments, the magnetic field sensors 304, 306 include Hall effect elements.

Continuing with the description of FIG. 3, the targets 310, 320, e.g., multipole ring magnets, used to measure angles are preferably manufactured and magnetized in the same machine to have the same error profile, thus improving accuracy. The number of pole pairs for each target (e.g., ring magnet) 310, 320 can also be optimized for the torsion on the rotatable member due to applied torque. For example, if the applied torque gives a maximum of 10 degrees of relative rotation, it may be desirable or preferable for each magnetic pole pair to span 20 degrees. This arrangement can produce optimal resolution and accuracy, as the electrical angle is multiplied by the mechanical angle for the angle measurements in exemplary embodiments. In the configuration shown, the ring magnets 310, 320 are preferably magnetized in the radial direction, orthogonal to the vertical axis 308 (Z-axis).

Figure 4:
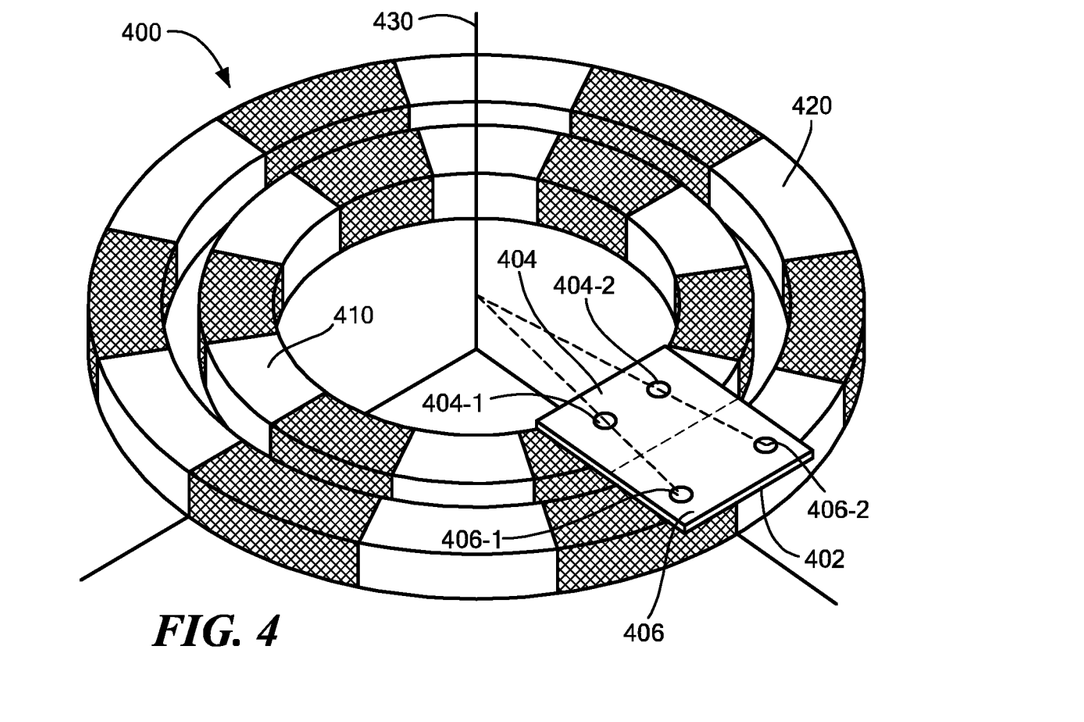
FIG. 4 is a diagram of an exemplary embodiment of a magnetic field differential torque sensor in an end-shaft configuration utilizing a common die, in accordance with the present disclosure.

FIG. 4 is a diagram of an exemplary embodiment of a magnetic field differential torque sensor 400 in an end-shaft configuration utilizing a common die for its magnetic sensing elements, in accordance with the present disclosure. The sensor 400 includes a die 402 on which two differential magnetic field sensors 404, 406 are disposed. Two ring magnets 410, 420 are present as magnetic targets for the sensors 404, 406, respectively. In the configuration shown, the ring magnets 410, 420 are preferably magnetized in the direction of the vertical axis 430 (Z-axis). While a torsion bar (elastic member) may be utilized as noted previously, this is omitted from FIG. 4 for the sake of clarity.

In exemplary embodiments, each sensor 404, 406 includes a pair of dual-axis Hall effect elements—shown by ellipses 404-1, 404-2 and 406-1, 406-2—with the die 402 being common to each of the sensors 404, 406. The die 402 may be encapsulated or contained in an IC package (not shown). In exemplary embodiments, the pitch between sensing elements of a sensor, e.g., 406, can be matched to the pitch of the corresponding target, e.g., magnetized regions of adjacent ring magnet 420. In example embodiments, the pitch of the inner sensing elements, e.g., of sensor 404, may be smaller than the pitch for the outer sensing elements, e.g., of sensor 406, as indicated by dashed lines passing through the sensing elements and intersecting the center of curvature/axis of rotation 430.

Figure 5:
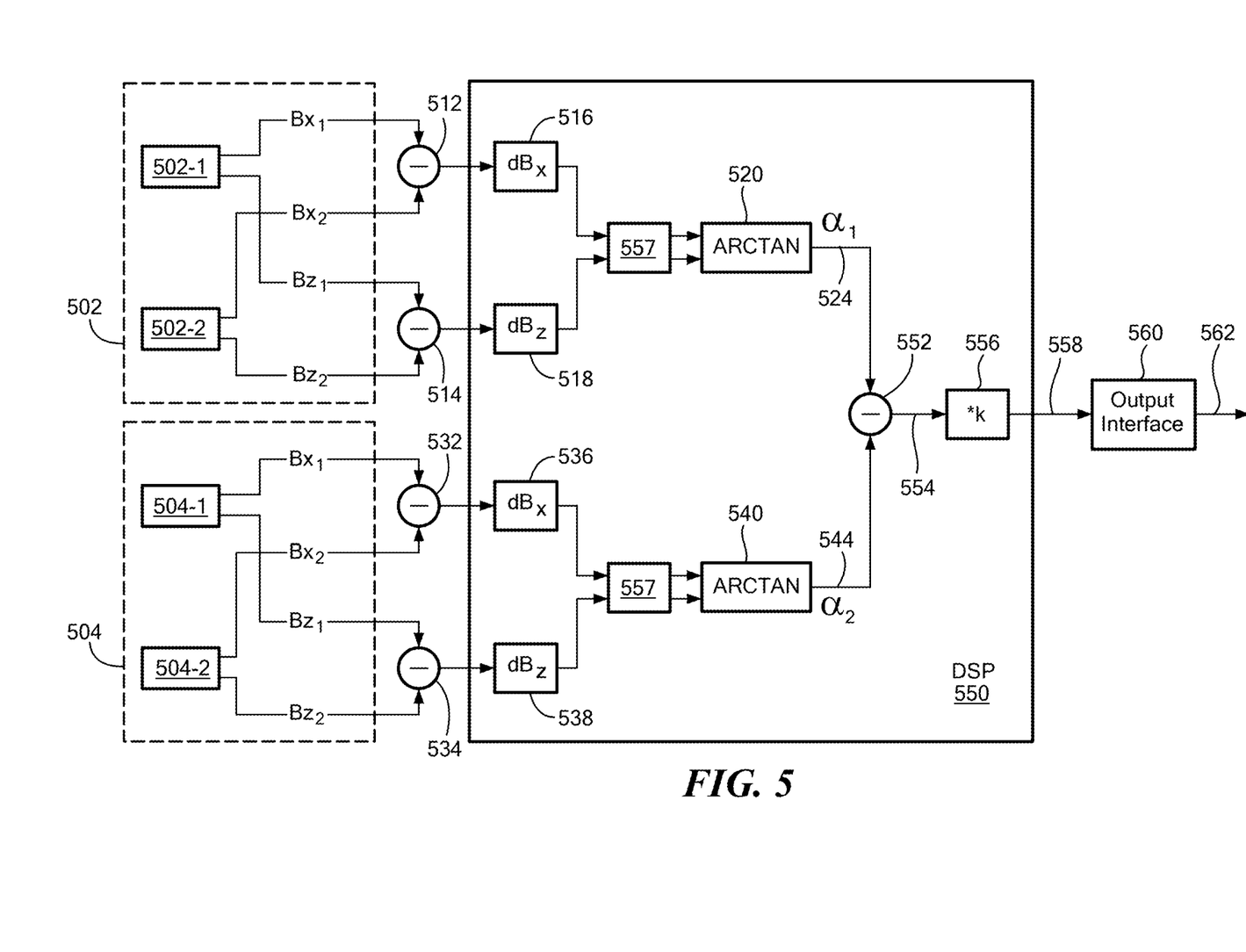
FIG. 5 is a circuit and signal flow diagram of an example magnetic field differential torque sensor, in accordance with the present disclosure.

FIG. 5 is a circuit and signal flow diagram of a magnetic field differential torque sensor 500, in accordance with exemplary embodiments of the present disclosure. The sensor 500 includes first and second differential magnetic field angle sensors 502, 504. Sensors 502, 504 can be the same as or similar to sensors 304, 306 (FIG. 3) or sensors 404, 406 (FIG. 4) and thus can be positioned adjacent to respective targets, e.g., ring magnets, whereby detection of the rotational angle of the targets can be processed to detect torque. Each sensor 502, 504 includes first sensing elements or sensing element arrays 502-1, 504-1 and second sensing elements or sensing element arrays 502-2, 504-2. Each of the first sensing elements 502-1, 504-1 includes a pair of sensing elements configured to detect orthogonal magnetic field components (i.e., have orthogonal axes of maximum sensitivity) such that each pair generates a sinusoidal and a cosinusoidal signal. Similarly, each of the second sensing elements 502-2, 504-2 includes a pair of sensing elements configured to detect orthogonal magnetic field components (i.e., have orthogonal axes of maximum sensitivity) such that each pair generates a sinusoidal and a cosinusoidal signal. For example, each of the magnetic field sensing elements (502-1, 502-2 and 504-1, 504-2) can include a pair of sensing elements positioned orthogonally to one another for detecting orthogonal magnetic field components, as indicated by X-axis and Z-axis components of the detected magnetic field (B). In exemplary embodiments, the magnetic field sensors 502, 504 include Hall effect elements.

With continued reference to FIG. 5, for each magnetic sensor 502, 504, the like component signals from the magnetic sensing elements (e.g., X-axis components and Z-axis components) are differentially processed, as shown by subtraction units 512, 514, 532, 534. The differential processing facilitates rejection of and/or resistance to deleterious effects of magnetic stray fields by removing the sensed magnetic stray fields, which are in most situations essentially uniform at the sensing elements to first or second order. The differential processing can also include or be followed by signal processing such as amplification and filtering, e.g., by a low pass filter to remove high-frequency noise. Chopping techniques well known in the art may be used to reduce or eliminate offset. Linearization and/or gain correction may also be included in the signal processing. The sensors 502, 504 can accordingly produce differential magnetic field signals (dBi) for respective orthogonal axes, as shown at 516, 518 and 536, 538.

From the differential magnetic field signals, ARCTAN ($\tan^{-1}$) processing or other suitable processing—such as by blocks 520 and 540 included in DSP 550—can be performed to determine angles $\alpha_1$, $\alpha_2$ (indicated by angle signals 524, 544) of rotation of the respective targets. In some embodiments, the ARCTAN processing can be implemented by coordinate-rotation-digital-computer (CORDIC) processing in DSP 550 or other suitable processor(s).

With continued reference to FIG. 5, the angle signals 524, 544 are provided to a processor (DSP) 550, which builds or determines (shown by subtraction unit 552) a difference 554 between the angles $\alpha_1$, $\alpha_2$. The processor 550 can subsequently multiply the difference 554 by a system defined factor k (indicated at 556) to obtain a value (558) indicative of torque applied to the rotatable member or members (e.g., shaft or shafts) to which the targets are connected. Other quantities, e.g., such as applied power, may be calculated from the difference 554, using other defined values (e.g., constants). Defined factor k may be a constant or variable (e.g., dependent on temperature) related to, e.g., the modulus of rigidity of the material(s) and/or moment of inertia of the rotatable member. An output interface module 560 can produce a sensor output signal 562 including information, e.g., a torque value, in one or more formats to meet the needs of a particular application.

In example embodiments, the output torque value 558 can be provided in the sensor output signal 562, e.g., in serial peripheral interface (SPI), single edge nibble transmission (SENT), puke-width modulation (PWM), inter-integrated circuit (I2C), and/or analog output formats. The differential flux density values and/or angle value between the two sensors 554 may be available to output in SPI and SENT protocols, for further example. Along with the magnetic data, the SPI and SENT options can provide access to additional device information, such as temperature error flag information and customer identification register data.

Embodiments of sensors according to the present disclosure may optionally employ processing to mitigate the effects of magnetic coupling that can occur between closely spaced magnetic sensing elements and/or magnetic sensors. For closely spaced magnetic sensing elements/sensors, each differential magnetic field signal dBi (e.g., in x and z directions) may be subject to cross-talk. By knowing the coefficient for that cross-talk, each differential signal can be corrected, e.g., before the ARCTAN blocks/processing. Such magnetic-coupling mitigation may be advantageously used for embodiments where magnetic sensors are positioned on a single, common die. In exemplary embodiments, a processor, such as DSP 550 or the like, is operative to perform such processing to mitigate the effects of magnetic coupling. For example, such mitigation may have particular utility in situations where a separation distance between sensing elements (of a same or different sensors) is on the order of a few millimeters, e.g., 3 mm, 2 mm, 1 mm, or the like.

For each magnetic field sensing element, a processor (e.g., DSP 550) can be configured to use the combined output from each of the sensor signals (516, 518, 536 and 538) along with known coupling factors from each of the targets, e.g., ring magnets, to determine the magnetic field from the closer target, e.g., ring magnet, more accurately at the locations of multiple magnetic sensing elements. The processor can be configured to generate coupling matrixes [A] and [B], which include the coupling factors for the two field directions being sensed from each target (e.g., ring magnet) to each sensor element, as shown by processing (algorithmic) block 557. The processor 550 can be further configured, e.g., via block(s) 557, to extract the magnetic field from the closer target (e.g., ring magnet) [Mx] and [Mz] for matrix equations Ax×Mx=Hx and Ay×My=Hy, where [Ai] is the coupling matrix and [Hi] is a matrix including the magnetic field signals from the plurality of magnetic field sensors with magnetic sensing elements. The processor can further be configured, e.g., via block(s) 557, to solve the matrix equation Ai×Mi=Hi, e.g., using a least squares method or pseudo-inverse method, to thereby generate an inversion matrix [Ci] such that Mi=Ci×Hi. The processor can include a multiplier configured, e.g., via block 557, to multiply the magnetic field signal from each of the plurality of magnetic field sensors by the matrix [Ci], thus correcting the sensed magnetic field values to account for the mutual coupling.

In some embodiments, e.g., such as where the magnetic sensing elements are subject to crosstalk, the coupling matrix can accommodate and vary with air-gap and/or absolute angle. For example, the coupling matrix can be modified to include a factor that reflects the dependence (inverse relationship) of signal strength on distance. For a given airgap, the signal strength will vary as the inverse of the distance (size) of the airgap. The absolute value of the angle vector (the vector composed from the orthogonal magnetic field measurements) can be determined, i.e., $=(x^2+z^2)^{0.5}$, and the inverse, i.e., $1/((x^2+z^2)^{0.5})$, can be used to adjust the coupling matrix to accommodate the given airgap. If angle is determined to be significant, the angle value can be calculated and introduced to the coupling matrix; the angle calculation could be iterated one or more times, e.g., to achieve a desired precision metric. In example embodiments, the coupling matrix—potentially including variation with air-gap and/or angle—can be stored in a look-up table.

Figure 6:
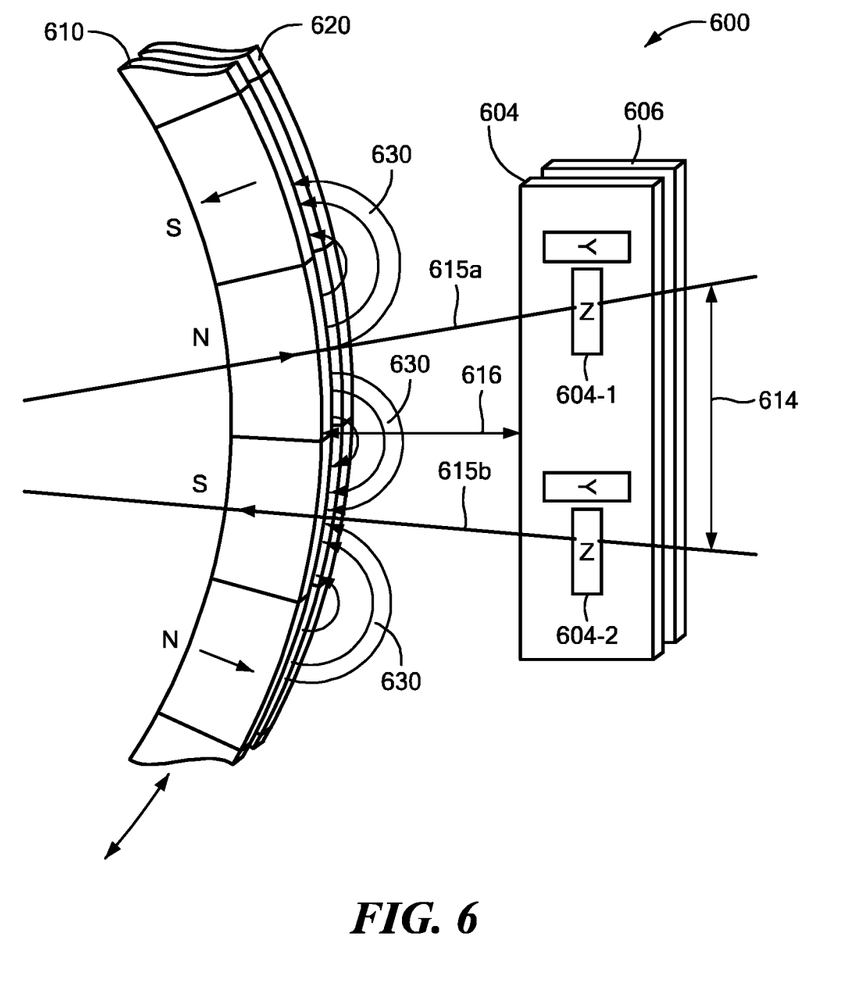
FIG. 6 is a side view of an example magnetic field differential angle sensor, in accordance with the present disclosure.

FIG. 6 is a side view of an example magnetic field differential angle sensor 600 in a side-shaft configuration, in accordance with the present disclosure. The sensor 600 includes first and second targets 610, 620, which are configured as ring magnets that are parallel to one another along a twist or rotation axis (orthogonal to the figure). The sensor 600 includes first and second differential magnetic field angular position sensors 604, 606, each configured as or part of an integrated circuit (IC). Each differential magnetic field angular position sensors 604, 606 includes first and second pairs (labeled as 604-1, 604-2 on sensor 604) of orthogonally configured magnetic field sensing elements (indicated by plates having Z-axis and Y-axis designations). As shown, magnetic flux 630 is generated by the targets, e.g., 610, with field lines shown emanating from North poles towards the adjacent South poles of the ring magnets 610, 620. In exemplary embodiments, like sensing elements of each sensor pair (e.g., 604-1, 604-2) have a between-element spacing 614 (at a distance, or airgap 616 from the target for a given application) that matches or is similar to the pole width of respective magnetic targets 610, 620, where pole width is indicated in angular terms as the centerline of one pole 615*a* to the centerline of an adjacent pole 615*b*. In alternate embodiments, the first and second differential magnetic field angular position sensors 604, 606 may be located on a common die, e.g., a die that is perpendicular to the plane of the drawing in a side shaft configuration similar to the one shown in FIG. 3.

Figure 7:
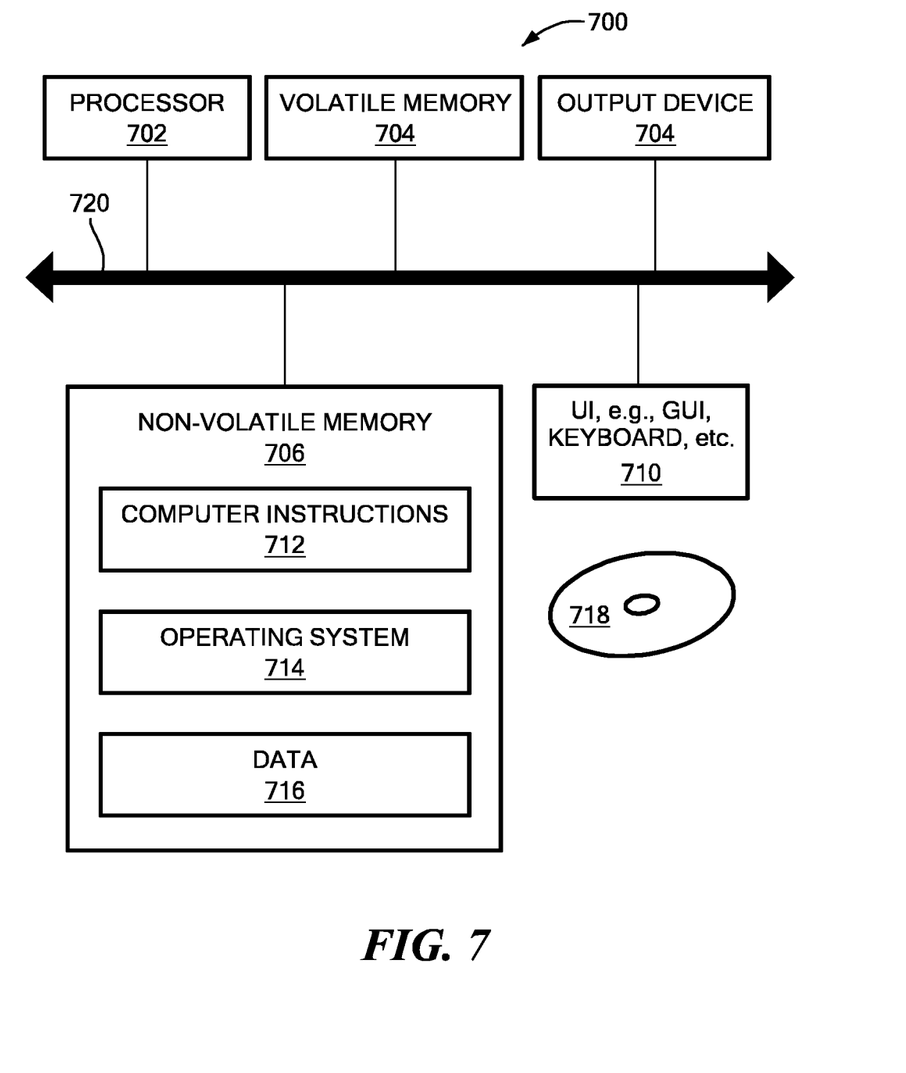
FIG. 7 is a block diagram of an example computer system operative to perform processing in accordance with the present disclosure.

FIG. 7 a block diagram of an example computer system 700 operative to perform processing in accordance with the present disclosure. The computer system 700 can perform all or at least a portion of the processing, e.g., steps in the algorithms, equations, and/or methods described herein. The computer system 700 includes a processor 702, a volatile memory 704, a non-volatile memory 706 (e.g., hard disk), an output device 708 and a user input or interface (UI) 710, e.g., graphical user interface (GUI), a mouse, a keyboard, a display, or any common user interface, etc. The non-volatile memory (non-transitory storage medium) 706 stores computer instructions 712 (a.k.a., machine-readable instructions or computer-readable instructions) such as software (computer program product), an operating system 714, and data 716. In one example, the computer instructions 712 are executed by the processor 702 out of (from) volatile memory 704. In one embodiment, an article 718 (e.g., a storage device or medium such as a hard disk, an optical disc, magnetic storage tape, optical storage tape, flash drive, etc.) includes or stores the non-transitory computer-readable instructions. Bus 720 may also be included, as shown.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), and optionally at least one input device, and one or more output devices. Program code may be applied to data entered using an input device or input connection (e.g., port or bus) to perform processing and to generate output information.

The system 700 can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. The programs, however, may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Accordingly, embodiments of the disclosure can afford benefits relative to prior art techniques. Such benefits may include, but are not limited to, providing systems, sensors, and techniques that employ contactless angle measurement and/or torque sensing that is resistant to and/or tends to reject stray magnetic fields and the deleterious effects of such stray magnetic fields. Such contactless angle measurement and/or torque sensing can be performed for various types of objects and in various applications. For example, such measurements and sensing can be accomplished for shafts that are only slowly rotating or that rotate through only a small angle, e.g., including zero (0) rpm and for angles less than, e.g., 90 degrees, 45 degrees, 30 degrees, 15 degrees, 5 degrees, etc. Embodiments of the present disclosure can provide for magnetic stray field robust angle and/or torque measurement with fewer and less expensive parts than conventional systems and techniques.

Various embodiments of the concepts, systems, devices, structures, and techniques sought to be protected are described above with reference to the related drawings. Alternative embodiments can be devised without departing from the scope of the concepts, systems, devices, structures, and techniques described. It is noted that various connections and positional relationships (e.g., over, below, adjacent, etc.) may be used to describe elements in the description and drawing. These connections and/or positional relationships, unless specified otherwise, can be direct or indirect, and the described concepts, systems, devices, structures, and techniques are not intended to be limiting in this respect. Accordingly, a coupling of entities can refer to either a direct or an indirect coupling, and a positional relationship between entities can be a direct or indirect positional relationship.

As an example of an indirect positional relationship, positioning element "A" over element "B" can include situations in which one or more intermediate elements (e.g., element "C") is between elements "A" and elements "B" as long as the relevant characteristics and functionalities of elements "A" and "B" are not substantially changed by the intermediate element(s).

Also, the following definitions and abbreviations are to be used for the interpretation of the claims and the specification. The terms "comprise," "comprises," "comprising," "include," "includes," "including," "has," "having," "contains" or "containing," or any other variation are intended to cover a non-exclusive inclusion. For example, an apparatus, a method, a composition, a mixture, or an article, which includes a list of elements is not necessarily limited to only those elements but can include other elements not expressly listed or inherent to such apparatus, method, composition, mixture, or article.

Additionally, the term "exemplary" is means "serving as an example, instance, or illustration. Any embodiment or design described as "exemplary" is not necessarily to be construed as preferred or advantageous over other embodiments or designs. The terms "one or more" and "at least one" indicate any integer number greater than or equal to one, i.e., one, two, three, four, etc. The term "plurality" indicates any integer number greater than one. The term "connection" can include an indirect "connection" and a direct "connection".

References in the specification to "embodiments," "one embodiment, "an embodiment," "an example embodiment," "an example," "an instance," "an aspect," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it may affect such feature, structure, or characteristic in other embodiments whether explicitly described or not.

Relative or positional terms including, but not limited to, the terms "upper," "lower," "right," "left," "vertical," "horizontal, "top," "bottom," and derivatives of those terms relate to the described structures and methods as oriented in the drawing figures. The terms "overlying," "atop," "on top, "positioned on" or "positioned atop" mean that a first element, such as a first structure, is present on a second element, such as a second structure, where intervening elements such as an interface structure can be present between the first element and the second element. The term "direct contact" means that a first element, such as a first structure, and a second element, such as a second structure, are connected without any intermediary elements.

Use of ordinal terms such as "first," "second," "third," etc., in the claims to modify a claim element does not by itself connote any priority, precedence, or order of one claim element over another, or a temporal order in which acts of a method are performed, but are used merely as labels to distinguish one claim element having a certain name from another element having a same name (but for use of the ordinal term) to distinguish the claim elements.

The terms "approximately" and "about" may be used to mean within ±20% of a target value in some embodiments, within plus or minus (±) 10% of a target value in some embodiments, within ±5% of a target value in some embodiments, and yet within ±2% of a target value in some embodiments. The terms "approximately" and "about" may include the target value. The term "substantially equal" may be used to refer to values that are within ±20% of one another in some embodiments, within ±10% of one another in some embodiments, within ±5% of one another in some embodiments, and yet within ±2% of one another in some embodiments.

The term "substantially" may be used to refer to values that are within ±20% of a comparative measure in some embodiments, within ±10% in some embodiments, within ±5% in some embodiments, and yet within ±2% in some embodiments. For example, a first direction that is "substantially" perpendicular to a second direction may refer to a first direction that is within ±20% of making a 90° angle with the second direction in some embodiments, within ±10% of making a 90° angle with the second direction in some embodiments, within ±5% of making a 90° angle with the second direction in some embodiments, and yet within ±2% of making a 90° angle with the second direction in some embodiments.

The disclosed subject matter is not limited in its application to the details of construction and to the arrangements of the components set forth in the following description or illustrated in the drawings. The disclosed subject matter is capable of other embodiments and of being practiced and carried out in various ways.

Also, the phraseology and terminology used herein are for the purpose of description and should not be regarded as limiting. As such, the conception upon which this disclosure is based may readily be utilized as a basis for the designing of other structures, methods, and systems for carrying out the several purposes of the disclosed subject matter. Therefore, the claims should be regarded as including such equivalent constructions insofar as they do not depart from the spirit and scope of the disclosed subject matter.

Although the disclosed subject matter has been described and illustrated in the foregoing exemplary embodiments, the present disclosure has been made only by way of example. Thus, numerous changes in the details of implementation of the disclosed subject matter may be made without departing from the spirit and scope of the disclosed subject matter.

Accordingly, the scope of this patent should not be limited to the described implementations but rather should be limited only by the spirit and scope of the following claims.

All publications and references cited in this patent are expressly incorporated by reference in their entirety.

What is claimed is:

1. A differential magnetic field torque sensor, the sensor comprising:
   a first multipole magnet assembly having a plurality of magnetic pole pairs and configured for coupling to a first rotatable shaft;
   a second multipole magnet assembly having a plurality of magnetic pole pairs and configured for coupling to a second rotatable shaft, wherein the first rotatable shaft is coupled to the second rotatable shaft by an elastic element;
   a first differential magnetic field angular position sensor positioned proximate to the first multipole magnet assembly and configured to produce an angular position of the first multipole magnet assembly;
   a second differential magnetic field angular position sensor positioned proximate to the second multipole magnet assembly and configured to produce an angular position of the second multipole magnet assembly; and
   a processing unit operative to receive an angular position from each of the first and second differential magnetic field angular position sensors and determine a difference between the angular positions, wherein the difference corresponds to an angle, and wherein the processing unit is operative to calculate, based on the angle, a torque applied to the first or second rotatable shaft;
   wherein each of the first and second differential magnetic field angular position sensors includes:
   (i) a first array of magnetic field sensing elements;
   (ii) a second array of magnetic field sensing elements, wherein the first array of magnetic field sensing elements is spaced a distance from the second array of magnetic field sensing elements, wherein the first and second arrays of magnetic field sensing elements each have at least first and second axes of maximum sensitivity, wherein the first axis of maximum sensitivity is orthogonal to the second axis of maximum sensitivity; and (iii) an angular position module operative to determine the angular positions of the first and second multipole magnet assemblies assembly from differential signals from the first and second arrays of magnetic field sensing elements;

wherein, for the first differential magnetic field angular position sensor, the distance the first array of magnetic field sensing elements is spaced from the second array of magnetic field sensing elements is configured to match a pitch of adjacent magnetic pole pairs of the first multipole magnet assembly; and wherein, for the second differential magnetic field angular position sensor, the distance the first array of magnetic field sensing elements is spaced from the second array of magnetic field sensing elements is configured to match a pitch of adjacent magnetic pole pairs of the second multipole magnet assembly.

2. The sensor of claim 1, wherein the first or second differential magnetic field angular position sensor comprises Hall effect elements.

3. The sensor of claim 1, wherein the first or second differential magnetic field angular position sensor comprises magnetoresistance elements.

4. The sensor of claim 1, wherein the angular position module comprises an arctan calculation module.

5. The sensor of claim 1, wherein the first or second multipole magnet assembly comprises a ring magnet.

6. The sensor of claim 1, wherein, for the first differential magnetic field angular position sensor, the differential signals from the first and second arrays of magnetic field sensing elements comprise a sine signal and a cosine signal.

7. The sensor of claim 1, wherein, for the second differential magnetic field angular position sensor, the differential signals from the first and second arrays of magnetic field sensing elements comprise a sine signal and a cosine signal.

8. The sensor of claim 1, wherein the elastic element comprises a torsion bar.

9. The sensor of claim 1, further comprising first and second sleeves, each having a proximal end and a distal end, wherein the first sleeve is coupled at the proximal end to the first rotatable shaft and at the distal end to the first multipole magnet assembly, and wherein the second sleeve is coupled at the proximal end to the second rotatable shaft and at the distal end to the second multipole magnet assembly.

10. The sensor of claim 9, wherein the first and second multipole magnet assemblies are disposed concentrically in a common plane in an end-shaft configuration, wherein the first multipole magnet assembly has a first radius, and the second multipole magnet assembly has a second radius different than the first radius.

11. The sensor of claim 10, wherein the first and second differential magnetic field angular position sensors are disposed on a common die in an end-shaft configuration.

12. The sensor of claim 11, wherein the common die is disposed adjacent the first and second multipole magnet assemblies and parallel to the common plane.

13. The sensor of claim 10, wherein the first and second multipole magnet assemblies are disposed in first and second parallel planes, respectively, in a side-shaft configuration.

14. The sensor of claim 13, wherein the first and second differential magnetic field angular position sensors are disposed on a common die.

15. The sensor of claim 14, wherein the common die is disposed adjacent the first and second multipole magnet assemblies and orthogonal to the parallel planes in a side-shaft configuration.

16. The sensor of claim 1, wherein the angular position module is operative to calculate a coupling matrix for magnetic coupling between the first and second arrays of magnetic field sensing elements.

17. The sensor of claim 16, wherein the angular position module is further operative to calculate an inversion matrix based on the coupling matrix and to correct the differential signals from the first and second arrays of magnetic field sensing elements.

18. The sensor of claim 1, wherein the processing unit is operative to calculate a coupling matrix for magnetic coupling between the first and second differential magnetic field angular position sensors.

19. The sensor of claim 18, wherein the processing unit is further operative to calculate an inversion matrix based on the coupling matrix and to correct the angular positions from the first and second differential magnetic field angular position sensors.

* * * * *